United States Patent [19]

Hackforth et al.

[11] 3,837,178

[45] Sept. 24, 1974

[54] FLEXIBLE SHAFT COUPLING

[75] Inventors: Bernhard Hackforth; Josef Hackforth, both of Wanne-Eickel, Germany

[73] Assignee: Vulkan Kupplungs-und Getriebau Bernhard Hackforth, Wanne-Eickel, Germany

[22] Filed: Mar. 19, 1973

[21] Appl. No.: 342,613

[30] Foreign Application Priority Data
Mar. 23, 1972 Germany............................ 2214093
Nov. 14, 1972 Germany............................ 2255680

[52] U.S. Cl. ................. 64/13, 64/11 R, 64/27 NM, 285/200, 403/372
[51] Int. Cl. ............................................. F16d 3/78
[58] Field of Search .......... 64/13, 27 NM, 11 R, 12; 403/291, 220, 372; 285/200; 74/237

[56] References Cited
UNITED STATES PATENTS

| | | | |
|---|---|---|---|
| 2,500,531 | 3/1950 | Eger.................................... | 285/200 |
| 2,630,340 | 3/1953 | Gaylard et al. ..................... | 285/200 |
| 3,207,539 | 9/1965 | Hackforth.......................... | 64/11 R |

FOREIGN PATENTS OR APPLICATIONS

| | | | |
|---|---|---|---|
| 256,134 | 8/1926 | Great Britain........................ | 64/13 |

*Primary Examiner*—Samuel Scott
*Assistant Examiner*—Randall Heald

[57] ABSTRACT

A flexible shaft coupling of the kind comprising a hub part and a co-axial surrounding ring part connected together by a flexible annular disc which is reinforced by one or more reinforcing inserts of textile or synthetic yarn or of wire the inner and outer edges of which are wrapped around stiffening rings near the inner and outer peripheries of the disc has the outer stiffening ring, and preferably the inner stiffening ring also, formed of strip-like material, the stiffening ring or rings thus being of flattened cross-section with the greater lateral dimension lying in the plane of the disc, so that the ring has a greater bending stiffness in a direction radially of the disc than in a direction axially of the disc. Preferably the stiffening rings are provided with axial holes and the inner and outer peripheral portions of the disc are clamped to the hub part and the surrounding ring part by means of clamping rings and clamping bolts which pass through holes in the clamping rings and through the axial holes in the flattened stiffening rings.

10 Claims, 7 Drawing Figures

PATENTED SEP 24 1974
3,837,178
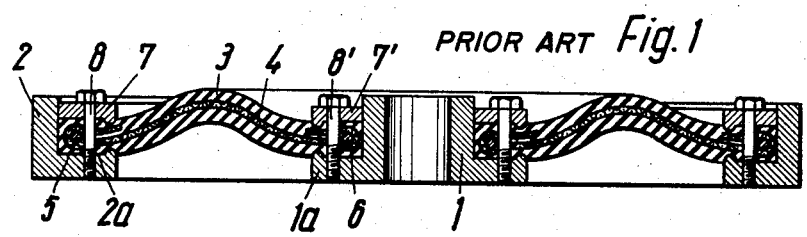
PRIOR ART Fig. 1
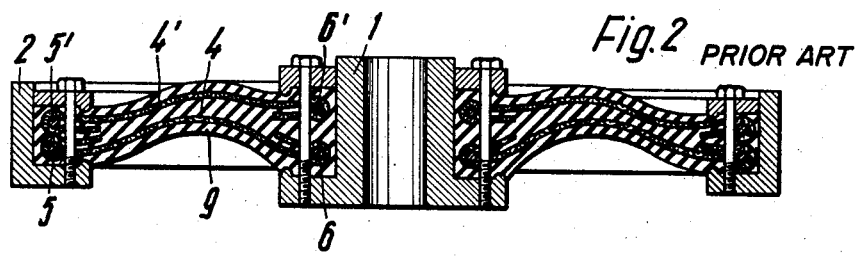
Fig. 2 PRIOR ART
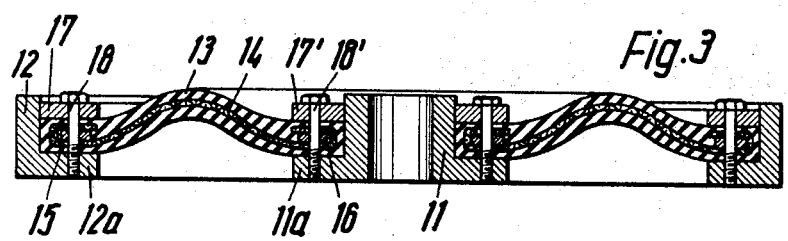
Fig. 3
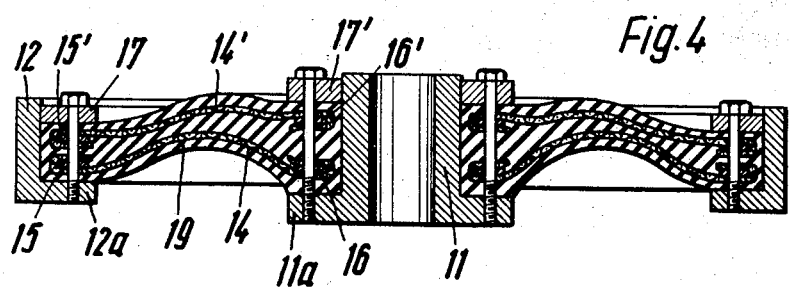
Fig. 4

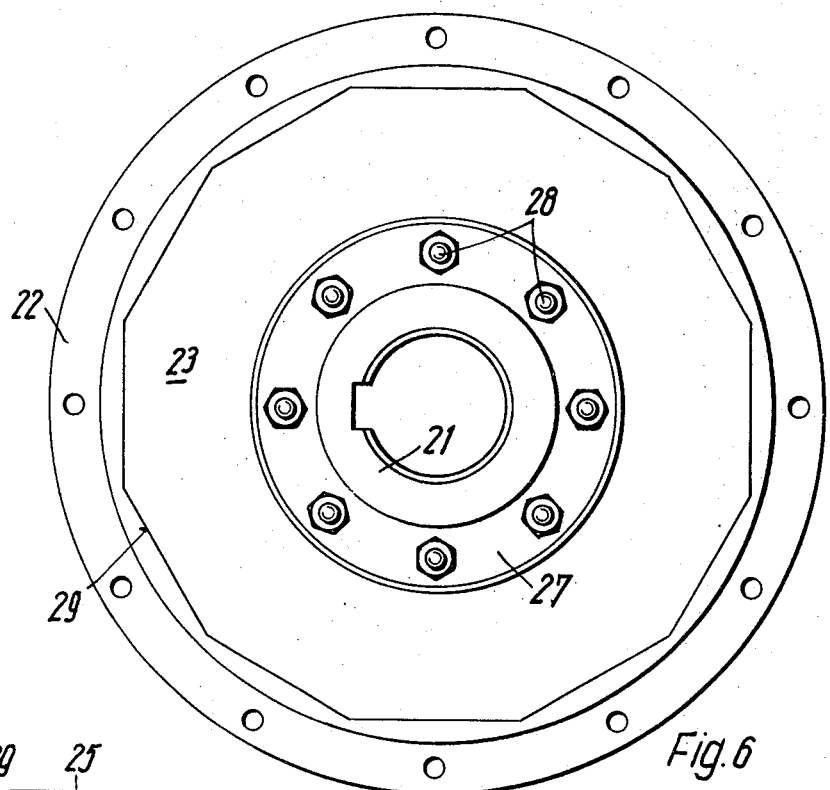
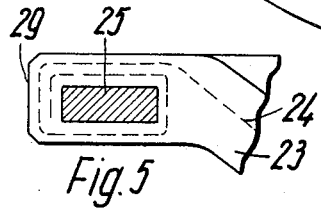
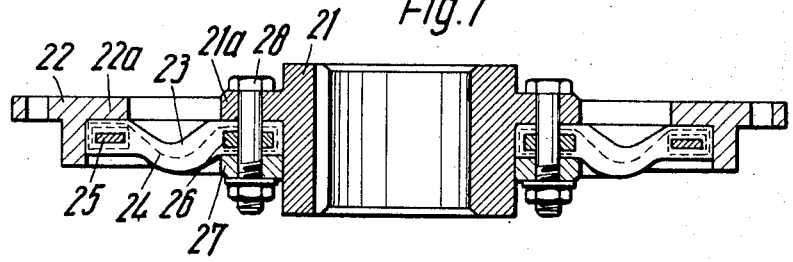

FLEXIBLE SHAFT COUPLING

This invention relates to flexible shaft couplings comprising a hub part and a co-axial surrounding ring part connected together by a flexible annular disc which is reinforced by at least one reinforcing insert of textile or synthetic yarn or of wire, the inner and outer edges of this insert being wrapped round a stiffening ring near each periphery of the disc.

In existing shaft couplings of this type, the reinforcing insert embedded in the flexible material of the disc which transmits the torque between the coupling parts usually consists also of a similarly disc-shaped piece of fabric, sometimes with radially oriented yarns or wires and the stiffening rings near the peripheries which are also embedded in the material of the flexible disc each consist of a wire of circular cross-section or of stranded wire.

In couplings with fabric inserts, appreciable disadvantages are caused both in manufacture of the reinforced discs and also later in operation of the couplings, as a result of the fact that the insert is appreciably less flexible and resilient in the direction of the mutually crossing fabric fibres than in all other radial directions. The result is that even in the manufacture of the annular discs, in which two or more raw rubber preforms with a reinforcing insert between each adjacent pair of them are vulcanised together under pressure, parts of the fabric insert become displaced or distorted and the insert then no longer extends uniformly between the inner and outer peripheries of the annular disc. This is especially so when the reinforced annular disc is domed on one side to increase its flexibility. Apart from the formation of folds, which are unavoidable in this case, such a distortion or partial displacement of the fabric insert cannot even be prevented by the stiffening rings, around which the inner and outer edges of the fabric insert are wrapped since especially the outer stiffening ring or rings yield under relatively small radially inwardly directed tensile stresses. These departures in the fabric insert and stiffening rings from the ideal shape and position gradually increase when the coupling is in operation until finally practically only those parts of the reinforcing insert and stiffening rings which lie in the region of two diameters perpendicular to one another contribute to the transmission of torque.

These disadvantages have a particularly unfavourable effect if the annular disc is secured to the adjacent coupling parts by means of clamping rings, which are tightened against the two rigid coupling parts, that is the hub and the surrounding ring, by screw threaded bolts passing through the annular disc between its stiffening rings and at a slight distance from the stiffening rings. In this case, due to the division of the fabric yarns or wires at the holes, a transmission of torque takes place almost only in the regions on both sides of the clamping bolts. This sooner or later leads to tearing of the reinforcing insert at the weakened points.

The above disadvantages are especially great with annular discs of fairly large dimensions, which are reinforced by a number of fabric inserts arranged face to face with stiffening rings at their peripheries. It is then almost impossible to prevent adjacent stiffening rings of circular cross section, from becoming entirely, or locally, radially displaced under the effect of the axial compressive forces used in vulcanising and under the radial tensile forces which occur in operation of the coupling. They then cross each other and become appreciably less subject to the clamping forces produced by the clamping rings, between the points where they cross each other than at their crossing points.

It is an object of the invention to produce a flexible shaft coupling of the kind described above in which changes in shape and disposition of the reinforcing inserts embedded in the annular disc and also of the stiffening rings are prevented or at least greatly reduced.

To this end, according to this invention, in such a coupling the outer stiffening ring and preferably the inner stiffening ring also is of metal and is of flattened cross-section having greater bending stiffness in a radial direction than in an axial direction.

Such flat rings which are bending resistant in the radial direction, that is in the plane of the disc, prevent distortion of the insert during bonding and vulcanising of the adjacent rubber components of the flexible disc and also prevent displacement of the insert during use of the coupling, either relative to the material of the annular disc or with corresponding movements of this material. The radially stiff flat ring also ensures that the annular disc is uniformly clamped around its entire outer periphery, and also around the entire inner periphery when both the outer and inner rings are of flattened section, including those cases where a number of fabric inserts and reinforcing rings lie face to face in the axial direction. This is because these radial stiff flat rings always maintain their form and position inside the mass forming the disc under the forces occurring during manufacture of the discs, during assembly of the coupling and in operation.

In order to prevent, in the region of the clamping points when the disc is clamped to the coupling parts, a displacement of parts of the insert caused by expulsion of material of the disc and a displacement of parts of the insert within the material of the disc under radial tension during operation of the coupling, the layers of this material on both faces of the flat stiffening rings and on both faces of the peripheral portions of the insert surrounding the stiffening rings should be sufficiently thin for them not to be compressed and expelled by the clamping forces and sufficiently thin to prevent parts of the insert from being pulled out by radial forces from the positions where it is clamped.

The flat rings also have a favourable effect even if the form of the insert ensures that it is equally flexible or inflexible in all directions under tensile forces. This means that the invention is beneficial whether the reinforcing insert consists of a piece of fabric with or without radial incisions or excisions, or of radially arranged individual yarns or wires, or is knitted or woven to suit the two or three dimensional form of the disc, or whether the yarns or loops of the fabric insert are bonded or otherwise fixed together at their crossing points.

If a reliable tensile attachment is ensured between the reinforcing insert and the radial stiff stiffening rings then it becomes unnecessary to clamp the edges of the annular disc to the rigid coupling parts by means of clamping rings and screws, provided that a torsional connection between the annular disc and the rigid coupling parts is ensured in some other manner. A tight fit between the disc and the coupling parts is sufficient for this purpose, for example by the outer periphery of the disc and the adjacent inner periphery of the surrounding ring of the coupling being shaped as similar polygons. Securing of the flexible disc against axial movements can then be achieved by friction by making the disc with a slight radial excess dimension and force fitting it into the rigid outer ring.

Securing against relative axial displacement of the flexible disc and the rigid coupling parts can indeed be dispensed with with advantage, for example in order that the coupling shall accept changes in length or longitudinal movements of the shaft coupled by it without additionally stressing the disc. An obvious prerequisite for this is a correspondingly long axial guide for the disc in the adjacent rigid coupling part.

Even when clamping of the peripheries of the flexible disc to the rigid coupling parts is dispensed with, a reliable fixing of the reinforcing insert to the radially stiff stiffening rings may be achieved in a simple manner in which, according to a further feature of the invention, at least the outer periphery of the insert is wrapped around the stiffening ring several times so that parts of the yarns or wires of the insert extending between the two stiffening rings cross over parts of the same or an adjacent yarn or wire.

In this way it is ensured that, under the tensile forces exerted during operation of the coupling upon the yarns or wires extending between the rigid coupling parts, each wrapped-over yarn or wire presses the underlying yarn or wire firmly against the stiffening ring and thereby makes displacement of the underlying yarn or wire impossible.

The elimination of clamping rings and bolts, especially at the outer periphery of the disc, leads to an appreciable reduction of the dimensions and of the mass of the coupling. The time and work involved in fixing the flexible disc is appreciably reduced, and moreover interruptions of insert yarns or wires due to the holes previously provided for the clamping bolts are avoided, together with the resulting reduction of the torque transmitted.

A number of examples of couplings in accordance with the invention will now be described with reference to the accompanying drawings, in which:

FIGS. 1 and 2 which are labeled "prior art" are diametric sections through conventional couplings of the kind with which the invention is concerned;

FIGS. 3 and 4 are diametric sections through similar couplings, but constructed in accordance with the invention;

FIG. 5 is a fragmentary radial section through part of a disc of a third example of a coupling in accordance with the invention;

FIG. 6 is a axial elevation of the third example; and

FIG. 7 ia a diametric section of the third example.

The shaft coupling shown in FIG. 1 comprises a hub part 1 to be fitted to the end of one shaft, a rigid surrounding ring part 2 to be connected to another shaft for example by means of a flange or flywheel, and a flexible and resilient rubber annular disc 3 connecting the parts 1 and 2 together.

The disc 3 is domed towards one side to increase its flexibility and is moreover provided with a reinforcing insert 4, which prevents excessive stretching of the rubber material. The reinforcing insert 4 consists in this example of a flat disc-shaped piece cut from a textile or wire fabric sheet. The inner and outer peripheries of the insert 4 are each wrapped round stiffening rings 5 and 6 respectively, so that the edge portions of the insert 4 consist of two fabric layers, which cohere at the outer and inner peripheries and each surround a stiffening ring.

The outer periphery of the annular disc 3 is connected to the coupling part 2 by being clamped between an inner flange 2a of this part and a clamping ring 7, which is held to the flange 2a by bolts 8 distributed around the coupling part 2. The bolts 8 are pierced through the double outer edge portion of the reinforcing insert 4 within the stiffening ring 5 and at a slight distance from it. Radial tension exerted inwards via the insert 4 onto the stiffening ring 5 is thus accepted by the bolts 8 and transferred by them to the outer ring part 2. In order to relieve the bolts 8 and the ring 5 from there tensile forces, and in order also that tensile forces exerted between adjacent bolts 8 shall be better transferred to the coupling ring part 2, the clamping ring 7 and the annular flange 2a are each provided at the adjacent faces of their inner peripheries with an annular bead, which increases the clamping force exerted in its region upon the annular disc 3.

In a corresponding manner, the inner peripheral portion of the annular disc 3 is secured to the hub part 1 by means of a clamping ring 7', an outer flange 1a of the hub part 1 and clamping bolts 8'.

The shaft coupling shown in FIG. 2 differs from that of FIG. 1 solely in that, for the purpose of transferring larger torsional forces, the rubber annular disc 9 is thicker and its thickness increases towards the hub part 1 as the shear forces produced by the torque increase. The annular disc 9 is provided in this example with two reinforcing inserts 4, 4' together with two pairs of stiffening rings 5, 5' and 6, 6' arranged face to face.

The example shown in FIG. 3 comprises a hub part 11, a ring part 12 and a rubber disc 13. Stiffening rings which are wrapped by the peripheral parts of a reinforcing insert 14 consist of radially stiff flat rings 15 and 16, and bolts 18, 18' extend with minimum clearance through holes in these flat rings. The flat rings accept uniformly around their entire peripheries radial forces acting upon them, without risk of displacement or changes of shape occurring. Consequently, annular beads on clamping rings 17, 17' and on flanges 12a and 11a are dispensed with in this example.

The coupling shown in FIG. 4 differs in the same way from the coupling shown in FIG. 2, as the coupling shown in FIG. 3 differs from that shown in FIG. 1. Flat stiffening rings 15, 15' on the one hand and 16, 16' on the other hand wrapped by peripheral parts of reinforcing inserts 14, 14', are not deformed either by radial or by axial forces. In this example also, the peripheral parts of the disc 13 lie against flat radial surfaces of flanges 11a and 12a and of clamping rings 17 and 17'.

In the example illustrated in FIG. 5, a method of attaching the outer periphery of a reinforcing insert 24, which is embedded in rubber material of a flexible disc 23, to an outer stiffening ring 25 is shown. The periphery of the insert is wrapped several times around the ring 25, so that yarns or wires of the insert 24 extending between the two stiffening rings cross parts underlying them of the same or adjacent yarns or wires. Because of this, when tension occurs in an inward direction, each yarn or wire presses the parts of the yarn or wire lying beneath it against the stiffening ring 25 and thereby, so to speak, clamps itself onto the ring 25.

This clamping effect is effected without relative movement between the mutually crossing yarn or wire components, if in the region of the stiffening ring the layers of rubber material are as thin as possible between parts of the insert 24 and between these parts and the ring 25.

This mode of securing of the periphery of the reinforcing insert 24 to the outer stiffening ring 25 makes it possible to dispense with the normal clamping of the outer periphery of the flexible disc 23 to the rigid outer ring part of the coupling between two radial annular surfaces forced together by axially extending clamping bolts.

The elimination of clamping rings and clamping bolts makes possible a substantial reduction in the moving mass of the coupling and a substantial simplification of assembly.

The example illustrated in FIGS. 6 and 7 comprises a flexible annular disc 23 constructed as described with reference to FIG. 5 and this disc is therefore simply pushed into an outer rigid coupling ring part 22, the push-in distance being limited by an inner flange 22a of the coupling ring part 22. Since the flange 22a does not have to accept any clamping forces, it can be of small dimensions both in the radial and also in the axial direction, so that the moving mass of the coupling ring part can be further reduced.

The flexible disc 23 is prevented from rotating relative to the outer ring part 22 of the coupling by its tight fit and by keying this is achieved by the disc 23 and the coupling ring part 22 having polygonal mating surfaces. To withstand certain relatively small axial forces which may occur during operation of the coupling, friction between an outer peripheral surface 29 of the disc 23 and the internal edge surface of the rigid coupling ring part 22, produced by slight over-dimensioning of the flexible disc 23, is sufficient.

An additional fixing of the disc 23 against axial displacements can be effected by simple abutments on the coupling ring part 22.

It is however also possible completely to relieve the flexible annular disc 23 from axial forces which are produced by changes in length or axial movements of the shafts connected by the coupling. This can be achieved by guiding the disc 23 to slide axially in the outer coupling ring part, if necessary between abutments.

At the hub part 21 of the coupling, the disc 23 is clamped in the usual manner between an outer flange 21a of the hub part 21 and a clamping ring 27, which is pulled towards the flange 21a by axial bolts 28. Consequently, the simple wrapping of the inner periphery of the reinforcing insert 24 once around the inner stiffening ring 26 is sufficient.

We claim:

1. In a flexible shaft coupling comprising a hub part a ring part coaxially surrounding said hub part and a flexible annular disc interconnecting said hub part and said ring part for torque transmission from one of said parts to the other of said parts and means reinforcing said flexible annular disc, said reinforcing means including at least one reinforcing insert thread of yarn or wire, an outer metal stiffening ring embedded in said disc near the outer periphery thereof and an inner metal stiffening ring embedded in said disc near the inner periphery thereof, peripheral portions of said thread being wrapped round said stiffening rings, the improvement wherein said outer stiffening ring is of flattened cross-section with its greater lateral dimension lying in the plane of said disc, said outer ring having greater bending stiffness in a radial direction thereof than in an axial direction thereof.

2. A coupling as claimed in claim 1, wherein said inner stiffening ring is of flattened cross-section with its greater lateral dimension lying in the plane of said disc, said inner ring having greater bending stiffness in a radial direction thereof than in an axial direction thereof.

3. A coupling as claimed in claim 1, wherein said outer stiffening ring has axial holes therethrough said surrounding ring has axial holes therethrough in register with said holes in said outer stiffening ring and further comprising a clamping ring having axial holes therethrough in register with said holes in said outer stiffening ring and said surrounding ring part and a plurality of clamping bolts passing through registering holes in said clamping ring, said outer stiffening ring and said surrounding ring part to clamp an outer peripheral part of said disc between said outer ring part and said clamping ring.

4. A coupling as claimed in claim 3, wherein said surrounding ring part and said clamping ring have flat radial surfaces in contact with said peripheral part of said disc.

5. A coupling as claimed in claim 1, wherein said insert at the outer peripheral portion thereof is wrapped several times round said outer stiffening ring whereby parts of said yarns or wires of said insert extending between said outer and said inner stiffening rings cross over underlying parts of the same or adjacent yarns or wires.

6. A coupling as claimed in claim 5, wherein said disc is secured against rotation relative to said surrounding ring part by being a tight keying fit within said ring part and is secured against axial movement relative to said surrounding ring part by friction.

7. A coupling as claimed in claim 5, wherein said disc is secured against rotation relative to said surrounding ring part by being a tight keying fit within said ring part and is guided for axial sliding movement relative to said ring part.

8. A coupling as claimed in claim 3, wherein said disc includes rubber-elastic material extending on both faces of said stiffening ring of flattened cross-section and over both faces of said outer peripheral portion of said insert where said insert is wrapped around said stiffening ring, said rubber-elastic material adjacent said clamping bolts being in the form of a thin, substantially non-cushioning coating which does not flow and is not expelled by the clamping forces generated on tightening said clamping bolts.

9. In a flexible shaft coupling comprising a hub part, a ring part coaxially surrounding said hub part, and a flexible annular disc interconnecting said hub part and said ring part for torque transmission from one of said parts to the other of said parts, and means reinforcing said flexible annular disc, said reinforcing means including at least one reinforcing insert thread of yarn or wire, an outer metal stiffening ring embedded in said disc near the outer periphery thereof and an inner metal stiffening ring embedded in said disc near the inner periphery thereof, peripheral portions of said thread being wrapped round said stiffening rings, the improvement wherein said outer stiffening ring is of flattened cross-section with its greater lateral dimension lying in the plane of said disc, said outer ring having a bending stiffness in a radial direction thereof, such that distortion of the outer ring by tension exerted thereon by the reinforcing thread when the coupling is in use is avoided.

10. A coupling as claimed in claim 9, wherein said inner stiffening ring is of flattened cross-section with its greater lateral dimension lying in the plane of said disc, said inner ring having a bending stiffness in a radial direction thereof such as distortion of the outer ring by tension exerted thereon by the reinforcing thread when the coupling is in use is avoided.

* * * * *